Jan. 11, 1938.  A. O. OLAFSON  2,104,932

SIGNAL

Filed Aug. 4, 1930  5 Sheets-Sheet 1

Inventor
Alvin O. Olafson
By Howard Finche
Attorney

Jan. 11, 1938.   A. O. OLAFSON   2,104,932
SIGNAL
Filed Aug. 4, 1930   5 Sheets-Sheet 2

Inventor
Alvin O. Olafson
By
Attorney

Jan. 11, 1938.  A. O. OLAFSON  2,104,932
SIGNAL
Filed Aug. 4, 1930   5 Sheets-Sheet 3

Inventor
Alvin O. Olafson
By Frank Fischer
Attorney

Jan. 11, 1938.　　　　A. O. OLAFSON　　　　2,104,932

SIGNAL

Filed Aug. 4, 1930　　　5 Sheets-Sheet 4

Inventor
Alvin O. Olafson
By Howard Fischer
Attorney

Jan. 11, 1938. A. O. OLAFSON 2,104,932
SIGNAL
Filed Aug. 4, 1930 5 Sheets-Sheet 5

Inventor
Alvin O. Olafson
By Howard Riches
Attorney

Patented Jan. 11, 1938

2,104,932

UNITED STATES PATENT OFFICE 2,104,932

SIGNAL

Alvin O. Olafson, St. Paul, Minn., assignor to National Traffic Signal Company, St. Paul, Minn., a corporation of Minnesota Application August 4, 1930, Serial No. 472,806

6 Claims. (Cl. 177—327)

My invention relates to traffic signals having a nature to provide an indication between the time of change of the signals so that pedestrians and the autoist may be advised of the time of change in such a manner as to assist in overcoming accidents. Heretofore to my knowledge signals have been provided for traffic which change so that traffic may be stopped in one direction and permitted to pass in another direction and the only indicating means that the signal is going to change traffic direction resided in a flasher, usually an amber light. Signals have been tried without these change indicators and with them, and in each case they apparently fail to overcome the autoist who rushes up to a signal when it is indicating for go in his direction and then upon reaching the signal finds it suddenly changing to stop. The pedestrian equally is not properly informed by the present signals, because it is quite apparent that the pedestrian might start walking across a street when having the right of way by the indication of the go signal and owing to the time that it takes to walk across the street, before the pedestrian is across the signal has changed and the pedestrian finds himself out in the middle of the street with traffic all around him. These undesirable features are overcome by my traffic signal in providing an indicator which appears in the last period of the signalling time clearly indicating to the pedestrian and autoist the time of change of the signal.

A feature of my invention resides in an indicator which operates always at the same relative speed and which will indicate that the signal is going to change and show definitely just how soon the signal will change. I accomplish this by an indicating member which appears in the flash or amber signal chamber and which travels across this chamber clearly indicating the definite time of change of the signal. Thus a pedestrian can look at my signal and tell just exactly when the signal is going to change, and I believe that my signal will avoid many of the traffic accidents caused by confusion of the signal operation and lack of knowledge of the time of change, as well as better regulating traffic. There will be no excuse for an autoist rushing by my traffic signal.

A further feature of my signal resides in means adapted to provide a zero or clearing period when all of the signals indicate red on all sides, thus permitting traffic to clear the intersection before traffic from the other direction starts. My traffic signal has means for indicating stop all around by having the red lights show on all sides for a short period which provides a clearing of traffic if it is desired. It is not necessary that this clearing period be employed, if it is not desired, however, my signal is designed to accomplish this in conjunction with the other features and the primary indicating feature to indicate the change of the signal.

When the red lights are on all around the green lights indicating go are off.

My signal is provided with a distributor which operates the circuits for the respective lights and for the motor which operates the indicators. The motor operating the indicators also operates the distributor and by means of a booster I overcome any overlap in the circuit operating cams and also accomplish with a timer a means whereby any number of signals may be kept in synchronized operation so that they will not get out of time for which each signal is set, and so that even if one of the signals is tampered with or stopped for repair, or stopped by a traffic officer temporarily, this or any one of the signals will again automatically readjust itself to operate in synchronism with the other signals with which it is primarily set to operate and will also adjust itself to the particular operation or time of operation for which its timer is set.

This means of operating the traffic signal permits me to accomplish certain results in a better way and overcome the undesirable features experienced heretofore to my knowledge by other signals where trouble with the breaker points of the circuits for the signals has been experienced when a heavy electrical load is carried on the breaking points of the switches. I practically eliminate breaker point trouble in my signals. Thus by my signal structure the breaking points will not become easily burned by a heavy load.

A further feature resides in the signal having an individual distributor which controls the lights and which also controls the motor which drives the distributor so that the distributor may operate intermittently. The motor which operates the distributor also operates the indicators. The indicator may operate on all four sides of the signal so that an indication of the change of the signal may be indicated on the red or stop side and the go or green side of the signal, or the signal may be arranged so that the indicators will show only on the green or go side. When no indicators are used on the red side there need be no indicating light for the change of the signal.

The operation of my signal is flexible to the extent that virtually any combination desired may be obtained for signalling traffic. Neither the indicator nor the amber lights are necessary with my individual signal distributor. The motors which operate the distributor also operate the indicator and are only on intermittently for a short period. I thus provide a signal having features very desirable and which overcomes many of the disadvantages in signals heretofore.

The details and objects will be more fully and clearly set forth throughout the specification and claims.

Figures 16, 17:
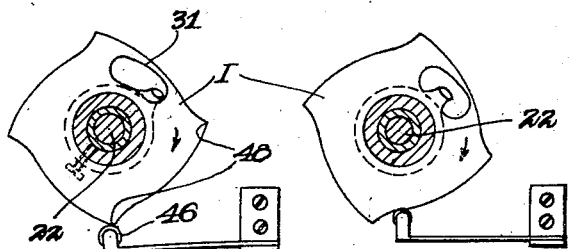

Figure 16 diagrammatically illustrates the booster cam for the motor cam.

Figure 17 is a similar view to Figure 16, with the parts in a different position.

Figure 18:
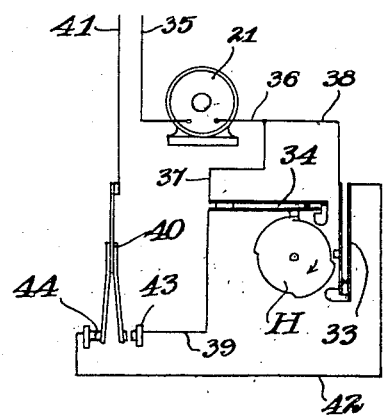

Figure 18 diagrammatically illustrates the electric wiring with the motor cam, the motor and the control timer switch.

Figure 19:
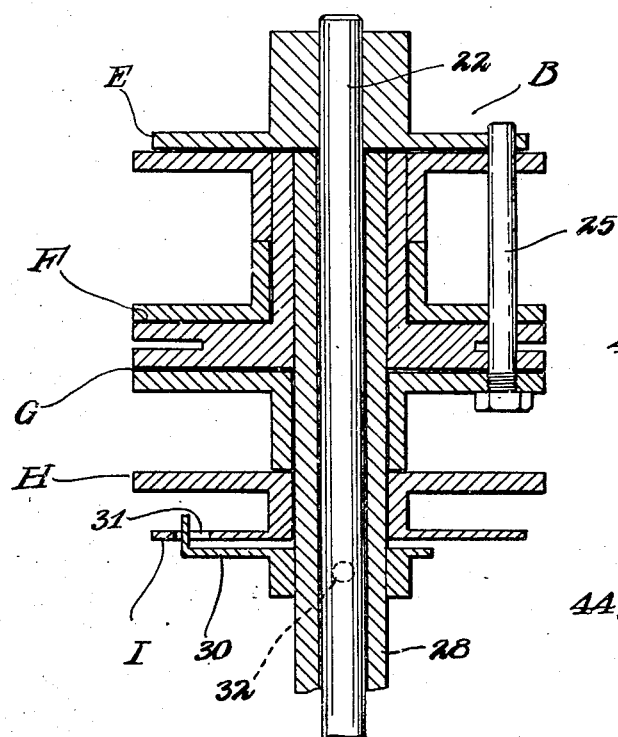

Figure 19 is an enlarged sectional view of the cams of the distributor and the operating shaft.

Figure 20:
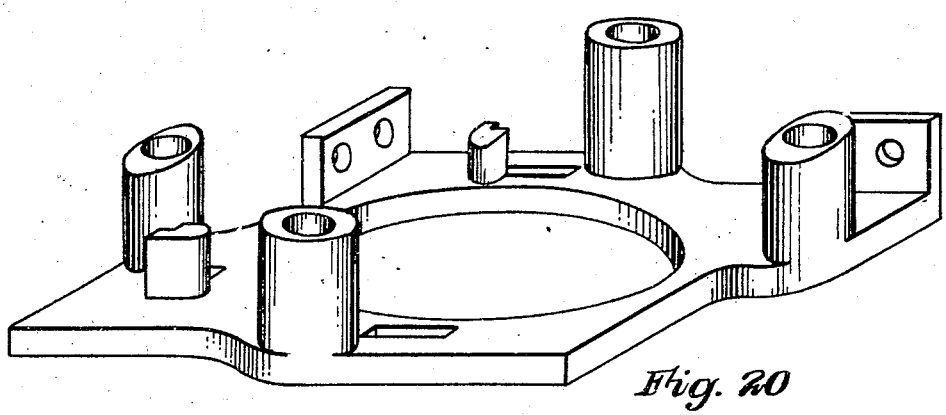

Figure 20 illustrates a perspective view of one of the spacer plates for the distributor.

Figures 1, 2:
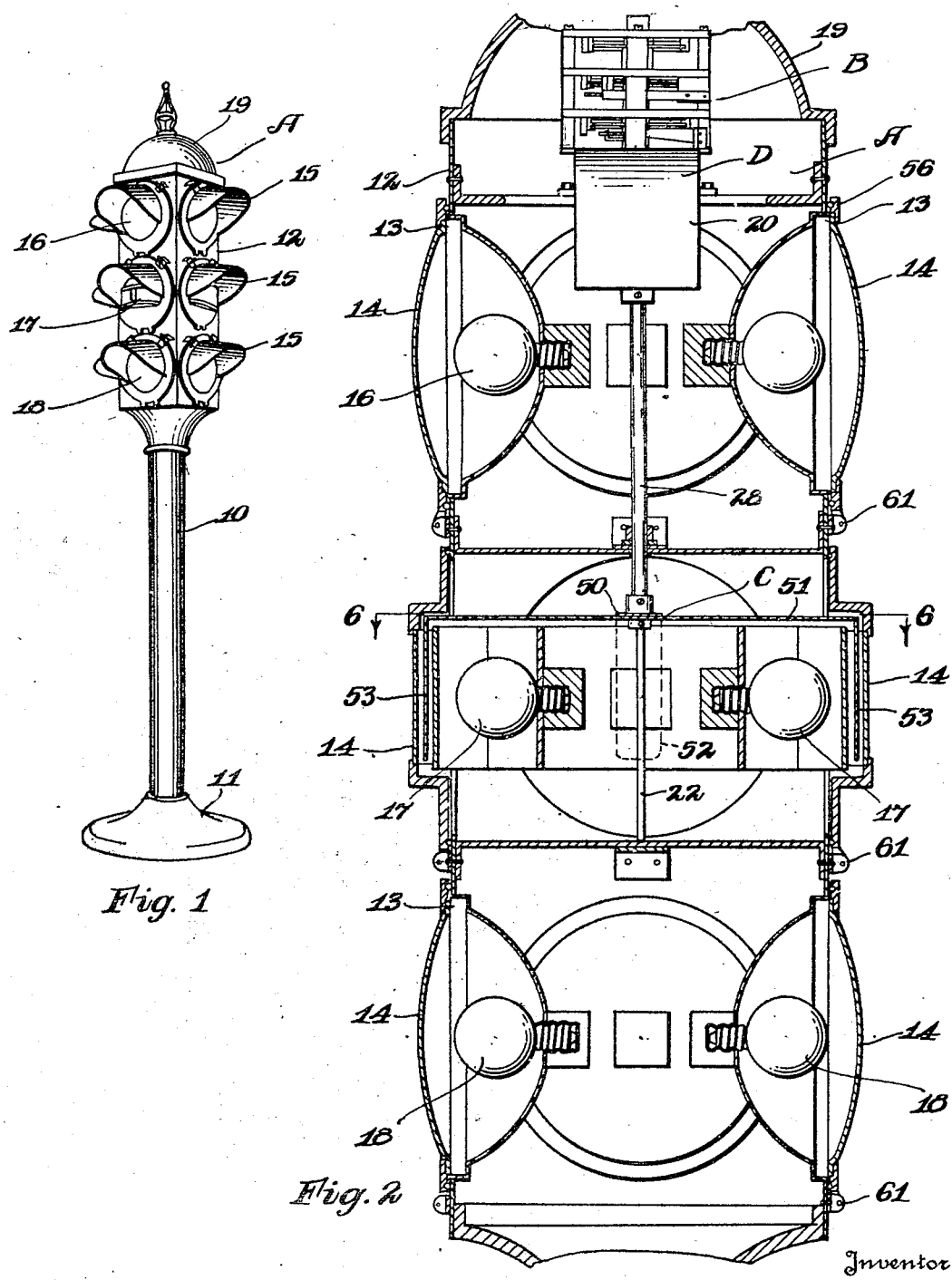
Figure 1 illustrates a perspective view of my signal.
Figure 2 is an enlarged sectional detail of the signal head, showing the respective position of the signal lights, the distributor and the indicator which indicates the changing of the signal.
Figure 3:
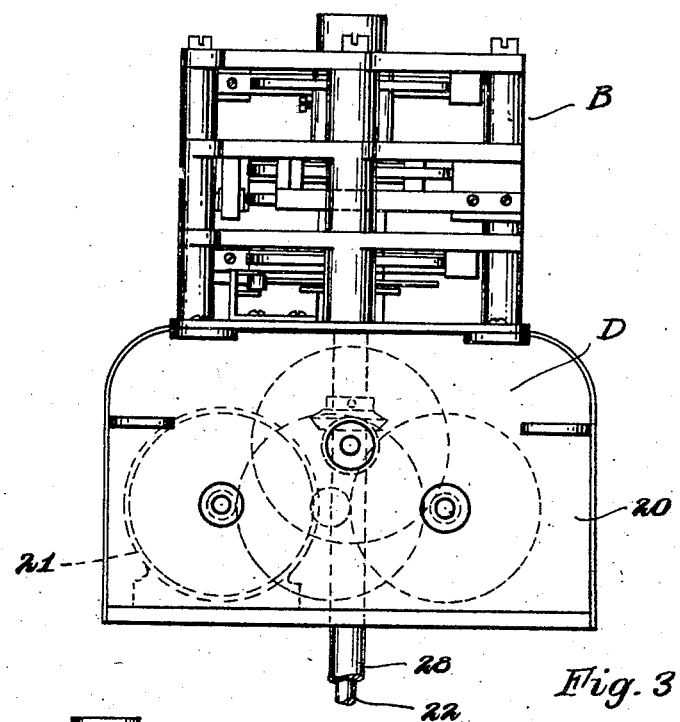
Figure 3 is a detail side view of the distributor, showing the motor and transmission.
Figure 4:
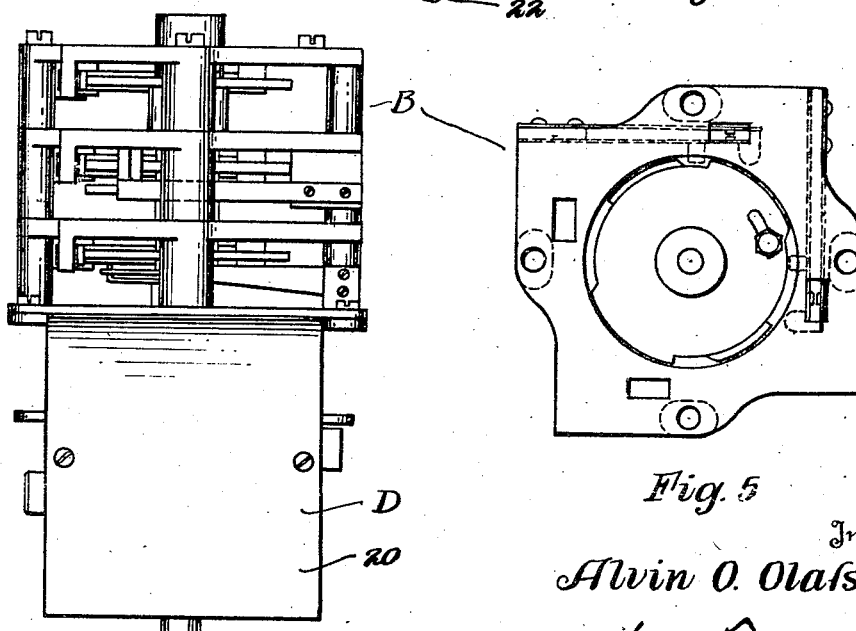
Figure 4 is an end view of the distributor in the opposite direction to Figure 3.
Figure 5:
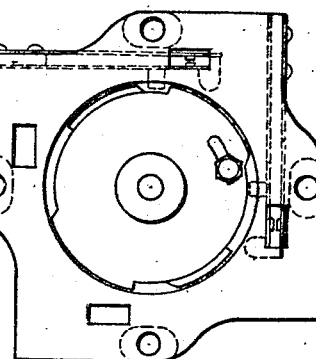
Figure 5 is a plan view of the distributor.
Figure 6:
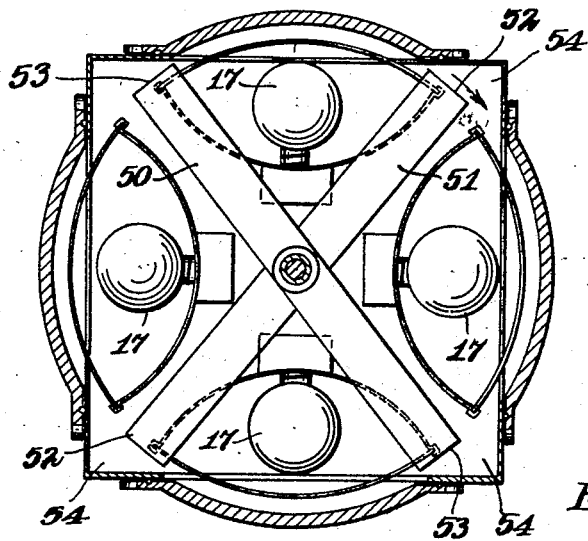
Figure 6 is a section on the line 6—6 of Figure 2.
Figure 8:
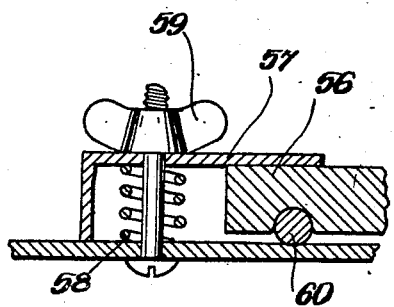
Figure 8 is a sectional detail of one of the clamping members for the lens frame.
Figure 7:
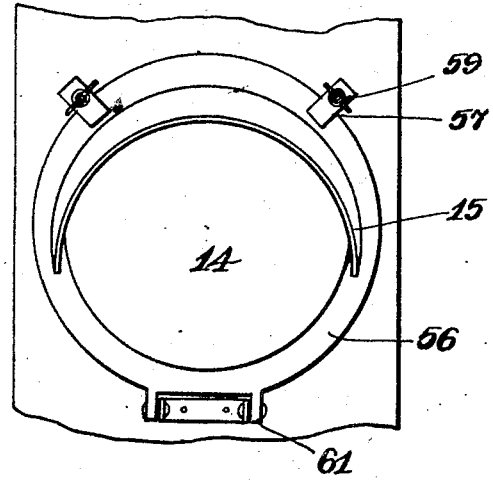
Figure 7 is a face view of one of the signal hoods and lens frame for the lights.

The signal A may have any suitable form and when in the design and construction as illustrated in Figure 1, the signal is supported upon the standard 10 which is mounted upon a base 11.

The casing 12 of the signal A is formed with the lens openings 13 on the different sides so as to provide the proper signal. Each lens opening may be covered by a lens 14 and over the top, hoods 15 may be provided to direct the signal light in the proper direction. The signal A is of a "bull's eye" type or form, insofar as the lights are concerned, however, the structure of the signal A is distinctly different in character and nature of operation, together with the general performance of the signal so as to accomplish certain results which will be fully and clearly set forth.

The upper series of lights 16 give the red light for the signal A, the center series of lights 17 give the amber or change indicating signals for the signal A, and the lower series of lights 18 provide the green lights for the signal A. In this manner I provide a different series of lights 16, 17, and 18 which are adapted to form the functions of signalling the traffic in the operation of my signal A.

The signal A is provided with a distributor B within the hood 19 and by removing the hood 19 the distributor may be easily accessible when it is desired. The features of the distributor are to operate and control the signal A and to govern and operate the indicating means C which is associated with the change signal lights 17.

The distributor B is operated by the transmission D within the casing 20 by means of the motor 21 in the casing 20 so that when the motor is in operation the distributor B is operated through the transmission D at the proper speed to control the series of lights 16, 17, and 18 of the signal A. Each of my signals A have this distinctive feature wherein a distributor is provided which operates and controls the operation of the lights and the signal indicating means.

Figure 9:
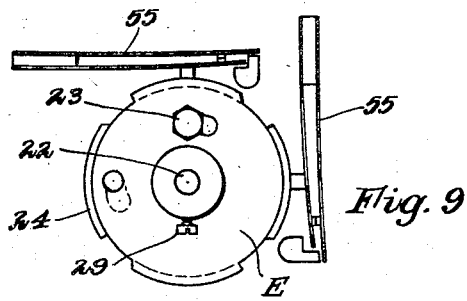
Figure 9 illustrates diagrammatically the operation of the amber or change light cams and switches.
Figure 13:
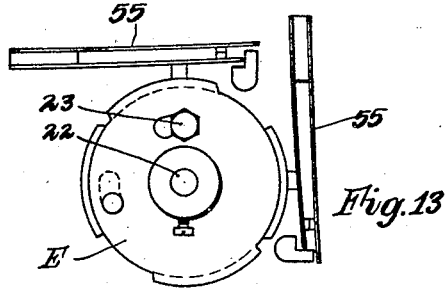
Figure 13 is a similar view to Figure 9, with the parts in a different position.
Figure 10:
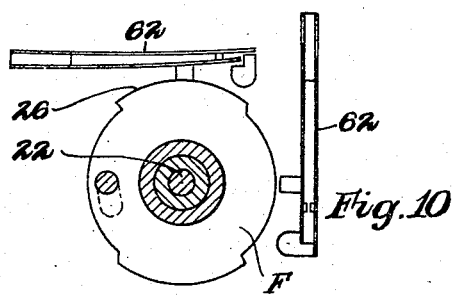
Figure 10 illustrates diagrammatically the operation of the red light cams and switches.

The distributor B is provided with a series of switch cams which are diagrammatically illustrated in Figures 9 to 17, inclusive, and which are operated by the motor 21 so that the signal A may be operated accordingly. The first set of switch cams E in the top of the distributor D operate to control the change signal lights 17. Figure 9 shows these cams in one position, while Figure 13 shows them in another position. The red light cams F are directly below the cams E and they control the switches for the red lights 16 of the signal A. The next set of cams G operate to control the switches for the green lights 18. The next cam H is adapted to operate the switches for the motor 21 and in conjunction with this cam H I provide a booster cam I which operates to boost the position of the cam H so that the switches for the motor 21 may be operated to prevent a dead point although a complete shut-off point for the motor 21 is provided. These different sets of cams are within the distributor B and are operated by the shaft 28 which is operated by the transmission D within the casing 20 from the motor 21. The sets of cams E, F, and G, may be of a single construction to provide set cams to operate the switches for the respective light circuits or they may be made adjustable so that the operating of the switches may be changed and prolonged or advanced as desired in order to change the time of red all around. In the drawings I have illustrated each of these cams E, F, and G, in pairs to provide adjustment of operation. If the cams are made of a singular nature then the operation of the signal A will be set for a definite predetermined operation and to change its operation it will be necessary to change these cams or replace them by adjustable cams. Ordinarily a signal is not required to be changed after its signalling period has been determined excepting for such change of operation as is controlled by the timer. I have not illustrated the timer here excepting diagrammatically to show that portion of the timer which is adapted to control the operation of the motor 21. This I have illustrated in the circuit in Figure 18.

Figure 14:
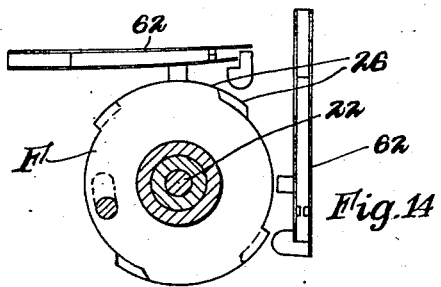
Figure 14 is a similar view to Figure 10, with the parts in a different position.
Figure 11:
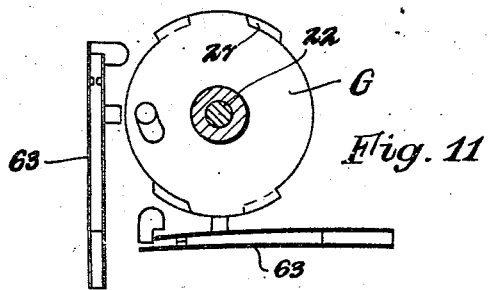
Figure 11 illustrates diagrammatically the operation of the green light cams and switches.
Figure 15:
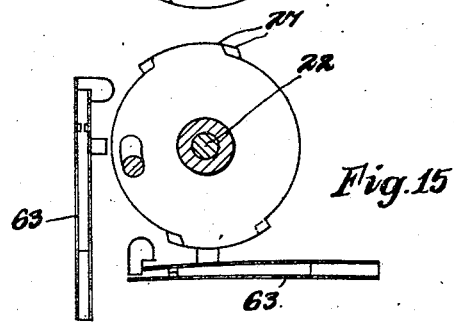
Figure 15 is a similar view to Figure 11, with the parts in different position.
Figure 12:
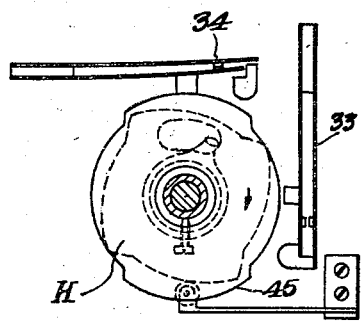
Figure 12 illustrates the motor operating cam and switches.

The cams E are positioned adjacent each other and by loosening or tightening the screw 23 these cams may be adjusted so as to set the cam edges 24 into different positions in relation to each other. I have shown a change in position of these cam edges 24 in Figure 13. All of the cams E, F, and G are connected together by means of the bolt 25 so that when the set of cams E are adjusted the other sets of cams F and G will be accordingly adjusted so as to be in the same general relative position to operate in unison to control the different circuits for the lights 16, 17 and 18. In each of the sets of cams E, F, and G a slot is provided in one of the cams, while the other cams are formed with an opening through which the bolt 25 extends. The relative position of the change of the sets of cams F and G that they would assume by reason of the change of the cams E in Figure 13, is illustrated by Figures 14 and 15. This shows how the sets of cams F and G would be relatively positioned with their cam edges 26 and 27, respectively, changed in position over the positions illustrated in Figures 10 and 11. An inner shaft 22 is provided within the tubular shaft 28, the purpose of which will be hereinafter described. The cams are mounted upon the shaft 28 so that adjustment may be made in relation to the same. One of the cams of the set E is held by the set screw 29 to the tubular shaft 28, while the other cams are operated through the pin or rod 25. In this manner the cams are operated together. The cam H is carried on the shaft 28 but is controlled by the cam arm 30 which extends through the slot 31 in the cam I and as the cam I is connected integrally or rigidly with the cam H and is below the same as illustrated in Figure 19, the cam H is carried by the operation of the motor 21. The cam arm 30 is carried by a suitable collar which connects with the operating shaft 28 by a set screw 32.

In the operation of the motor 21 the shaft 28 is rotated causing the distributor cams E, F, and G to rotate accordingly. The circuit for operating the motor 21 is controlled by the cam H with the switches 33 and 34 and I have illustrated this circuit diagrammatically in Figure 18. A current supply comes into the motor 21 through the wire 35 and from the motor the current passes through the wire 36, then either through the wire 37 or 38. If the current passes through the wire 37 it then passes through the switch 34 and from the switch 34 through the wire 39 and through the timer switch 40 and back to the line current through the wire 41. If the current passes from the line wire 35 through the motor 21 through the wire 36 and through the wire 38 to the switch 33, then the circuit will follow through the wire 42 from the switch 33 to the timer switch 40 and back to the line wire 41. The operation of the cam H controls the switches 33 and 34. This cam H controls the operation of the motor 21. The timer switch 40 is operated to contact either with the points 43 or 44 so as to complete a circuit back to the line wire 41. In operation the distributor operates faster than the timer. I have not illustrated in the drawings the means of operating the timer switch 40. However, the timer switch 40 is operated to simply throw the switch to either contact with the point 43 or with the point 44. In Figure 18 the diagram of the circuit illustrates the switch 40 contacting with the contact points 44. The circuit in Figure 18 shows the switch 33 open with the switch 34 closed. Thus the motor 21 could not be operated until the timer had thrown the switch 40 to contact with the points 43. When this takes place the distributor cam H starts to operate and owing to the fact that it operates faster than the timer, and the fact that the cam H is arranged so that the operating current will be shut off to the motor 21 as soon as the motor has rotated the cam H sufficiently to break one of the switches 33 or 34, the motor 21 stops and the distributor mechanism stands at rest until the timer switch 40 is moved over to contact with the proper contacting points, either 43 or 44 to complete a circuit to again operate the motor 21. To provide this shut-off point for the motor the switch operating cams 45 of the cam H are only of sufficient length to permit the motor circuit 21 to be closed for a certain period and to break the circuit to the motor 21 long enough to stop the same. Just as the motor is stopped the cam H will have rotated the booster cam I to a point to permit the wheel 46 carried by the spring arm 47 to drop off of the high point 48 of the booster cam I, boosting the cam I forward which also rotates the cam H owing to the connection between the cam H and the cam I so as to cause the cam H to close one of the switches 33 or 34, immediately after the motor 21 has stopped. This places the motor 21 with one of its switches 33 or 34 closed but it breaks the continuous operation of the motor 21. This booster cam I in this manner keeps the motor circuit in proper timed operation.

The structure of the distributor B operates to control the lights 16, 17, and 18, and to control the motor 21. By stopping the motor 21 through its operating cam H and by means of the booster cam I with the spring 47 which pushes the cam I with a snap forward to close one of the circuits for the motor 21 after it has stopped, I am able to connect any number of signals A together and be assured of the distributors being operated in unison with each other. This permits me to control the signals A so that they are automatic in readjusting themselves to properly synchronized time with any of the other signals as they are originally set, owing to the control of the distributor B. Each distributor B is operated by the timer switch 40 and by a suitable timer switch operating mechanism, not illustrated in this application. If I connect together a series of the signals A which are individually controlled by their separate distributors B, with the timer switch such as 40, providing a single timer and switch 40 for each signal or providing a master timer for all of the signals, should any one of the signals A be tampered with leaving it out of time, it would automatically readjust itself to the proper timed operation by means of the distributor cam means H and booster cam I. In other words, the signal A which was out of step with the other signals because it had been tampered with, would automatically come into step of operation with the other signals A. This is insured by the controlling circuit for the motors 21 of each of the signals A and the switches 33 and 34 for controlling the operation of the motor 21. This is a very important feature of my signal because should it become necessary for a traffic officer to step up to a corner and operate one of my signals A by manual control, no matter at what point the officer left the signal it would again automatically come into unison of operation with the other signals. The importance of this automatic adjustment of each signal will also be appreciated in the making of repairs or adjustments on any one of the signals. Manual actuation of the signal is accomplished by turning off the means for automatically operating switch 40, and by manually operating the switch 40.

A further feature of advantage of the structure of my signals where each signal has an individual distributor B, resides in the controlling of the lights of the signal by the distributor B rather than having the lights controlled through the timer has heretofore. My structure overcomes the trouble with the breaker points either in the timer or with the other circuits controlling the lights of the signals A. In no case is it necessary for me to so heavily load the breaker points of the controlling timer, either for the master timer or for the individual timers, to cause burning of the points, and by my signal I accomplish in this manner a very important feature of advantage over signalling structures and circuits used heretofore to my knowledge.

A further feature of my signal resides in the indicator C. This indicator operates to indicate to the traffic the changing of the signals to direct traffic from one direction to another. This indicating mechanism is of a simple nature and it is carried out by means of a pair of indicating arms 50 and 51 from which depend the indicating fingers 52 and 53. Each arm 50 and 51 have two indicating fingers, such as 52 and 53. These arms 50 and 51 are ordinarily set to extend at right angles to each other when the circuits and cams E, F, and G are set in the position illustrated in Figures 9, 10, and 11. The arm 50 is carried by the tubular shaft 28, while the arm 51 is carried by the shaft 22. This permits the arms 50 and 51 to be adjusted into different positions by the adjustment of the cams E, F and G. When the cams E, F, and G are set in the position illustrated in Figures 13 to 15, inclusive, then the relative position of the indicating fingers 52 and 53 is changed so that the fingers 52 and 53 are relatively closer together between two parts of the three hundred and sixty degrees of rotation and relatively farther apart in the other two parts of the three hundred and sixty degrees of relative rotation. This permits the changing and adjusting of the indicating fingers 52 and 53. The fingers 53 depends as illustrated in Figure 2 to extend between the lights 17 and the lenses 14 for the lights 17. These indicating fingers 52 and 53 are set so that as the motor 21 operates the fingers 52 and 53 are caused to travel across the lens opening 13 and to indicate the change of the signal lights 16 and 18. When the motor 21 stops these pairs of indicating fingers 52 and 53 will come to rest in the spaces 54 in the corners of the casing 12 of the signal A where they are invisible. Further, the indicating lights 17 will be out when they are not in signalling position. These lights are controlled by the set of cams E with the respective switches 55. The indicating fingers 52 and 53 are set to start to operate at the last portion of the signalling period so that anyone coming up to my signal A may be advised that the signalling period is just about over and the signal is about to change direction of travel of the traffic by the relative position of the signal fingers 52 and 53. For instance, if the signal fingers 52 and 53 have just started across the lens openings 13 for the lights 17 the pedestrian or autoist will know that they only have that portion of time that it takes for the indicating fingers 52 and 53 to travel across the lens opening 13 before the signal A will change direction of travel of traffic and thus no mistake, accident of misunderstanding will be caused by misjudging the operation of the signal. My signal provides a definite operation, easily observed and prevents accidents and mistakes by misjudgment of the signal. My signal permits the pedestrian to walk across the street freely, or to quicken his pace because he knows that the signal is about to change.

One pair of the signal arms, such as 50 or 51, may be removed so that the signal fingers 52 or 53 may indicate only on two sides. For instance, the indication may be only on the green side if it is desired, so that the going traffic will know that it is about time for them to stop by reason of the changing of the signal. The best results are obtained with the indicators on all sides. However, the indicators 52 and 53 may be entirely removed and only the change lights 17 operated or even these lights may be dispensed with if it is desired. My signal A then merely displays stop and go signals at the desired timed intervals without employing a change indicator of any type.

The advantages of the distributor B are of extreme importance in the continued successful operation of a traffic signal and I believe that I have accomplished a result long desired in providing an individual distributor for each signal having the controlling features which permit each signal to operate at the proper time, also causing the signals to automatically readjust themselves if for any reason they are stopped or changed for operation for the time being, all of which features are highly desirable in a traffic signal. The feature of providing means for a minimum of load on the breaking points of either the timer or the distributor also provides features which are highly desirable in traffic signals where they must continue to operate day after day.

In the attachment of the lens supporting frames 56 for each of the lenses 14, I provide a spring bracket member 57 operated by the spring 58 and the thumb screw 59 so as to rigidly clamp the frames 56 in closed position with a suitable packing 60 to keep the moisture out of the signal casing 12. The lens brackets 56 are preferably hinged at the bottom at 61 so that the lens bracket may be dropped down at any time it is desired to enter the light chamber of the respective lights 16, 17 or 18.

The light cams F are provided with switches 62 for operating the circuits for the red lights 16 which are controlled by the cams F. The cams G operate the switches 63 which operate the circuits for the green lights 18. The circuits for the operation of the respective lights may be controlled in accordance with the cams and the operation of the respective switches. When it is desired, the red light circuits may be controlled by the cams F to cause a red light or stop signal to be shown all around the signal before the green lights come on on any side of the signal to indicate the travel of traffic. This is accomplished by increasing the red light display periods for one or both streets until the stop signals for both streets overlap. The manner of adjusting the cams F has been described. This is called a clearing period and the distributor B may operate readily to take care of the same.

I believe the features which I accomplish with my signal are of importance in the carrying out of a practical signal for all purposes where the pedestrian may be advised of the change, where the signals may operate to readjust themselves automatically into unison of operation one with the other so that traffic may be guided through street arteries and highways in a uniform manner, together with a means of permitting a large number of signals to be placed under the control of a timer without danger of burning the points and insuring continued operation, are all features which will be readily recognized as advantages over and a step forward in the art of traffic signals.

In accordance with the patent statutes I have described the principles of my signal and while I have endeavored to carry out by a showing such structure as will be best adapted to the principles and features set forth, these are only illustrative of a means of accomplishing the desired results, and changes, variations, and other combinations may be accomplished within the scope of the following claims.

I claim:

1. A traffic signal comprising means to signal traffic to go, means to signal traffic to stop, a plurality of switches, circuits each containing one of said switches, means for periodically and sequentially energizing said circuits, an electric motor, means connecting said circuits to said motor, means operated upon a predetermined travel of said motor to open said energized circuit through the said switch in last said circuit, and to close the circuit to be next energized through the switch in its circuit, means connected to said signalling means and operating to alternate their signal display when the said motor is operated, and means operated only when said motor is operated to continually indicate the time remaining before the said signal display is changed.

2. A traffic signal comprising, signal lights, signal circuits to said lights, a circuit closing means in each of said circuits, a distributor including means for operating said circuit closing means, means including an intermittently operable motor for operating said distributor to drive said circuit closing means to operate said signals for the routine control of traffic, a time lapse indicator arm, and means operated by said motor when the latter is operating to move said arm to indicate the time remaining before a change of signals.

3. A traffic signal comprising, stop and go signal lights, a change signal light, circuits thereto, circuit closing means for said circuits, a distributor for controlling said circuit closing means, means including an intermittently operable motor for operating said distributor to drive said circuit closing means to operate said signals for the routine control of traffic, an indicator arm, and means operable by said motor when the same is in operation to move said arm across said change signal to indicate the time remaining before a change of signals.

4. A traffic signal for an intersection of two highways including, a stop signal visible along one highway, a second stop signal visible along the other highway, a go signal visible along one highway, a second go signal visible along the other highway, a series of signalling light circuits, electric switches for controlling signalling light circuits, an adjustable distributor for operating said switches whereby the duration of the go signal on either highway may be varied with respect to the duration of the stop signal on the other highway, means for operating said distributor to drive said switches to operate said signals for the routine control of traffic, adjustably mounted rotatable indicating fingers operable by said distributor when the same is in operation adapted to indicate the time of change of the signal lights, and means for adjusting said fingers to vary the relative time of display of said fingers for each highway.

5. In a traffic signal, a go signal, a stop signal, means for displaying one of said signals, a change signal, a casing including a window, means for mounting said caution signal for display through said window, a motor, means for intermittently operating said motor, means operated by operation of said motor to alternate the display of said stop and go signals by said displaying means, an indicating finger, means operating during operation of said motor for displaying said change signal and moving said finger across said window to indicate the time remaining before said alternation of the display of stop and go signals.

6. In a traffic signal, a go signal, a stop signal, means for displaying one of said signals, a change signal, a casing including a plurality of windows, means for mounting said caution signal for display through said windows, a motor, means for intermittently operating said motor, means operated by operation of said motor to alternate the display of said stop and go signals by said displaying means, indicating finger means mounted for movement past said windows, and means operating during operation of said motor for displaying said change signal and moving said finger means across said windows to indicate the time remaining before said alternation of the display of stop and go signals.

ALVIN O. OLAFSON.